US010399513B2

(12) United States Patent
Gillay

(10) Patent No.: US 10,399,513 B2
(45) Date of Patent: Sep. 3, 2019

(54) VEHICLE DOORS INCLUDING DOOR TRIM ASSEMBLIES AND VEHICLES INCLUDING SAME

(71) Applicant: TOYOTA MOTOR ENGINEERING & MANUFACTURING NORTH AMERICA, INC., Erlanger, KY (US)

(72) Inventor: Daniel F. Gillay, Plymouth, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 236 days.

(21) Appl. No.: 15/483,184

(22) Filed: Apr. 10, 2017

(65) Prior Publication Data

US 2018/0290603 A1 Oct. 11, 2018

(51) Int. Cl.
*E06B 3/00* (2006.01)
*B60R 13/02* (2006.01)
*B60J 5/04* (2006.01)

(52) U.S. Cl.
CPC ......... *B60R 13/0243* (2013.01); *B60J 5/048* (2013.01); *B60J 5/0408* (2013.01); *B60J 5/0413* (2013.01); *B60R 2013/0281* (2013.01); *B60R 2013/0287* (2013.01); *B60R 2013/0293* (2013.01)

(58) Field of Classification Search
CPC ..... B60R 13/00; B60R 13/0243; B60R 13/06; B60R 2013/0287; B60J 5/0413; B60J 10/86; B60J 10/84
USPC .......... 49/501, 502, 475.1, 479.1; 296/146.7
See application file for complete search history.

(56) References Cited

U.S. PATENT DOCUMENTS

| | | | |
|---|---|---|---|
| 6,929,309 B1 * | 8/2005 | Radu | B60R 13/0243 296/146.7 |
| 7,108,312 B2 * | 9/2006 | Cowelchuk | B29C 44/086 296/146.7 |
| 7,156,437 B2 * | 1/2007 | Cowelchuk | B60R 13/02 296/1.08 |
| 7,788,853 B2 * | 9/2010 | Narimatsu | B60R 13/0243 296/146.7 |
| 7,871,119 B2 * | 1/2011 | Schoemann | B60R 13/0243 296/146.7 |
| 8,562,069 B2 | 10/2013 | Yamaguchi et al. | |
| 8,840,169 B2 | 9/2014 | Tanizawa | |
| 2005/0140166 A1 * | 6/2005 | Dry | B60R 13/0243 296/146.7 |
| 2005/0258666 A1 * | 11/2005 | Reed | B60R 21/04 296/153 |

(Continued)

FOREIGN PATENT DOCUMENTS

| | | |
|---|---|---|
| JP | 2008006906 | 1/2008 |
| JP | 2012011804 | 1/2012 |

*Primary Examiner* — Chi Q Nguyen
(74) *Attorney, Agent, or Firm* — Dinsmore & Shohl LLP

(57) ABSTRACT

A vehicle includes a vehicle body and a vehicle door connected to the vehicle body. The vehicle door includes an interior trim panel including an upper board and an ornament member that is connected to an interior surface of the upper board. The ornament member has a front edge, a rear edge and side edges that extend from the front edge to the rear edge. The ornament member includes an interference member that extends outwardly from at least one of the front edge, the rear edge and the side edges and extends under the upper board to interface with the upper board during a side impact event.

20 Claims, 13 Drawing Sheets

(56) References Cited

U.S. PATENT DOCUMENTS

| | | | |
|---|---|---|---|
| 2006/0017306 A1* | 1/2006 | Smith | B60J 5/0418 |
| | | | 296/146.7 |
| 2010/0269307 A1* | 10/2010 | Yamaguchi | B60R 13/0243 |
| | | | 24/289 |
| 2012/0126570 A1* | 5/2012 | Nagamura | B60R 7/046 |
| | | | 296/146.7 |
| 2012/0231215 A1* | 9/2012 | Hayashi | B60R 13/0243 |
| | | | 428/138 |
| 2015/0072105 A1* | 3/2015 | Miyashita | B60R 13/02 |
| | | | 428/118 |
| 2016/0001646 A1* | 1/2016 | Yamada | B60J 10/75 |
| | | | 52/716.5 |

* cited by examiner

VEHICLE DOORS INCLUDING DOOR TRIM ASSEMBLIES AND VEHICLES INCLUDING SAME

TECHNICAL FIELD

The present specification generally relates to vehicle doors and, more specifically, vehicle doors including door trim assemblies for vehicles.

BACKGROUND

Vehicle door assemblies include door trim assemblies that are used to cover a door panel and provide various features and also a visually acceptable appearance within the vehicle. During a side impact, the door trim assemblies tend to move into a cabin of the vehicles depending on where the side impact occurs. It is desirable to limit movement of components of the door trim assemblies into the cabin. The movement of components of the door trim assemblies into the cabin can interfere with a variety of impact devices, such as side airbag assemblies.

Accordingly, a need exists for vehicle doors including door trim assemblies that limit movement of components of the door trim assemblies into the cabin of the vehicles during side impacts.

SUMMARY

In one embodiment, a vehicle includes a vehicle body and a vehicle door connected to the vehicle body. The vehicle door includes an interior trim panel including an upper board and an ornament member that is connected to an interior surface of the upper board. The ornament member has a front edge, a rear edge and side edges that extend from the front edge to the rear edge. The ornament member includes an interference member that extends outwardly from at least one of the front edge, the rear edge and the side edges and extends under the upper board to interface with the upper board during a side impact event.

In another embodiment, an interior trim panel for a vehicle door includes an upper board and an ornament member connected to an interior surface of the upper board. The ornament member has a front edge, a rear edge and side edges that extend from the front edge to the rear edge. The ornament member includes an interference member that extends outwardly from at least one of the front edge, the rear edge and the side edges and extends under the upper board to interface with the upper board during a side impact event.

In yet another embodiment, a method of assembling an ornament member to an interior trim panel of a vehicle door is provided. The method includes connecting the ornament member to an upper board of the interior trim panel at an ornament connection location located on an interior surface of the upper board. An interference member that extends outwardly from at least one of a front edge, a rear edge and side edges for the ornament member is located under the upper board to interface with the upper board during a side impact event.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to door assemblies for vehicles that include door trim assemblies that control movement of components of the door trim assemblies during a side impact event. The door trim assemblies include one or more portions including an upper portion including an upper board. The upper board includes a relatively rigid substrate body and a relatively flexible outer covering that covers the substrate body. An ornament member is provided on the upper board. The upper board includes a cut-out region that is used to connect a rear end of the ornament member to an outside of the substrate body. As will be described in greater detail below, an interference member is provided at the rear end of the ornament member that interfaces with the substrate body during a side impact, which limits movement of the rear end of the ornament member relative to the substrate body during the side impact.

Figure 1:
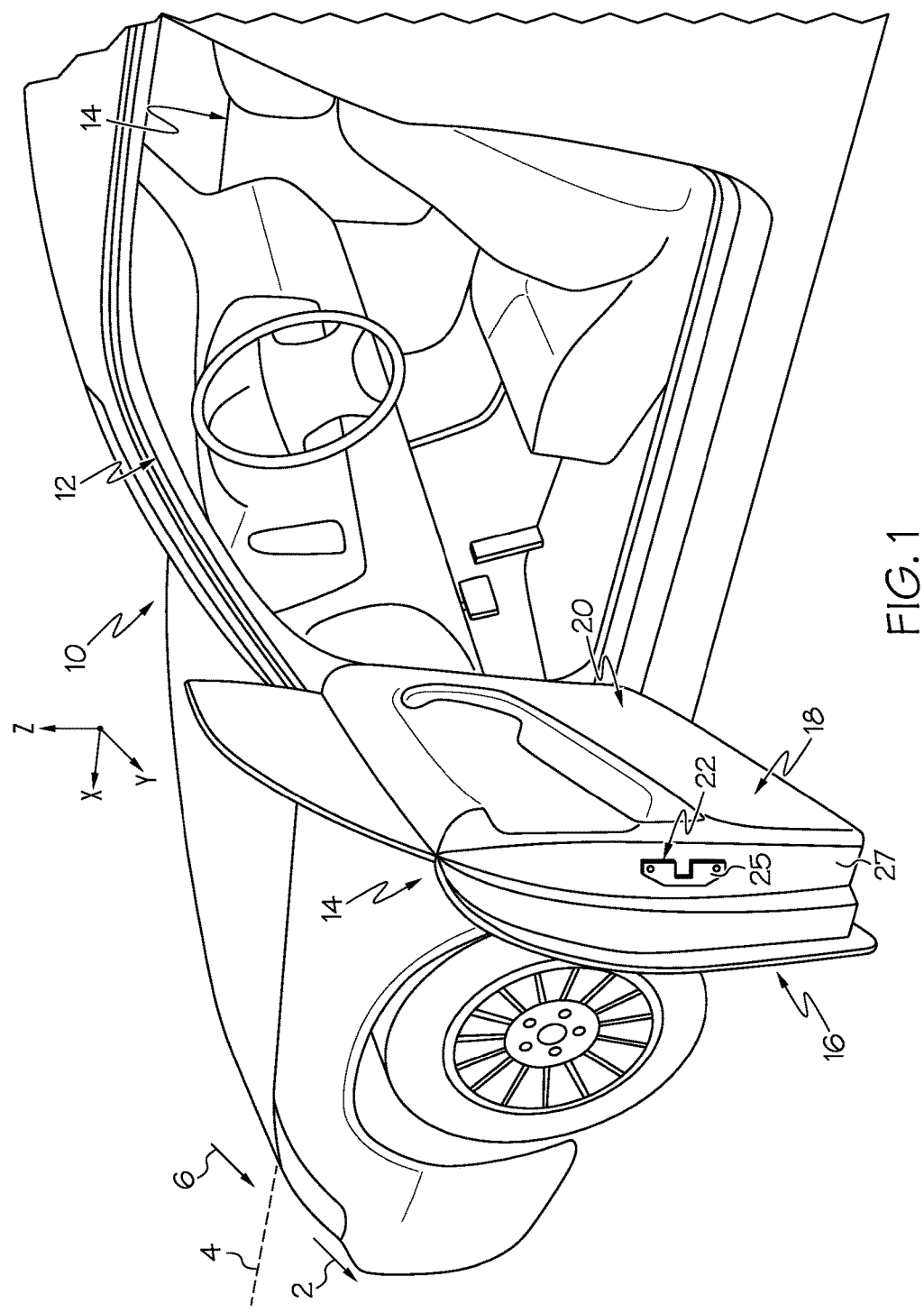
FIG. 1 is a side, partial view of a vehicle, according to one or more embodiments shown and described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

In FIG. 1, selected portions of the vehicle 10 are illustrated. The vehicle 10 generally includes a vehicle body 12 with a vehicle door 14. The vehicle door 14 may include an outer panel 16 and an inner panel 18 that is connected to the outer panel 16 to define a volume therebetween. The outer panel 16 may be an outer visible panel of the vehicle body 12, while the inner panel 18 may be an interior door trim panel 20 that is visible from inside the vehicle 10. A door latch assembly 22 may be located at least partially within the volume between the outer panel 16 and the inner panel 18 of the vehicle door 14. The door latch assembly 22 may include a door latch 25 that is located at a shut face panel 27 that is located between the outer panel 16 and the inner panel 18. While the driver side vehicle door 14 is illustrated, the passenger side vehicle door 14 may include the same or similar components as the driver side vehicle door 14.

Figure 2:
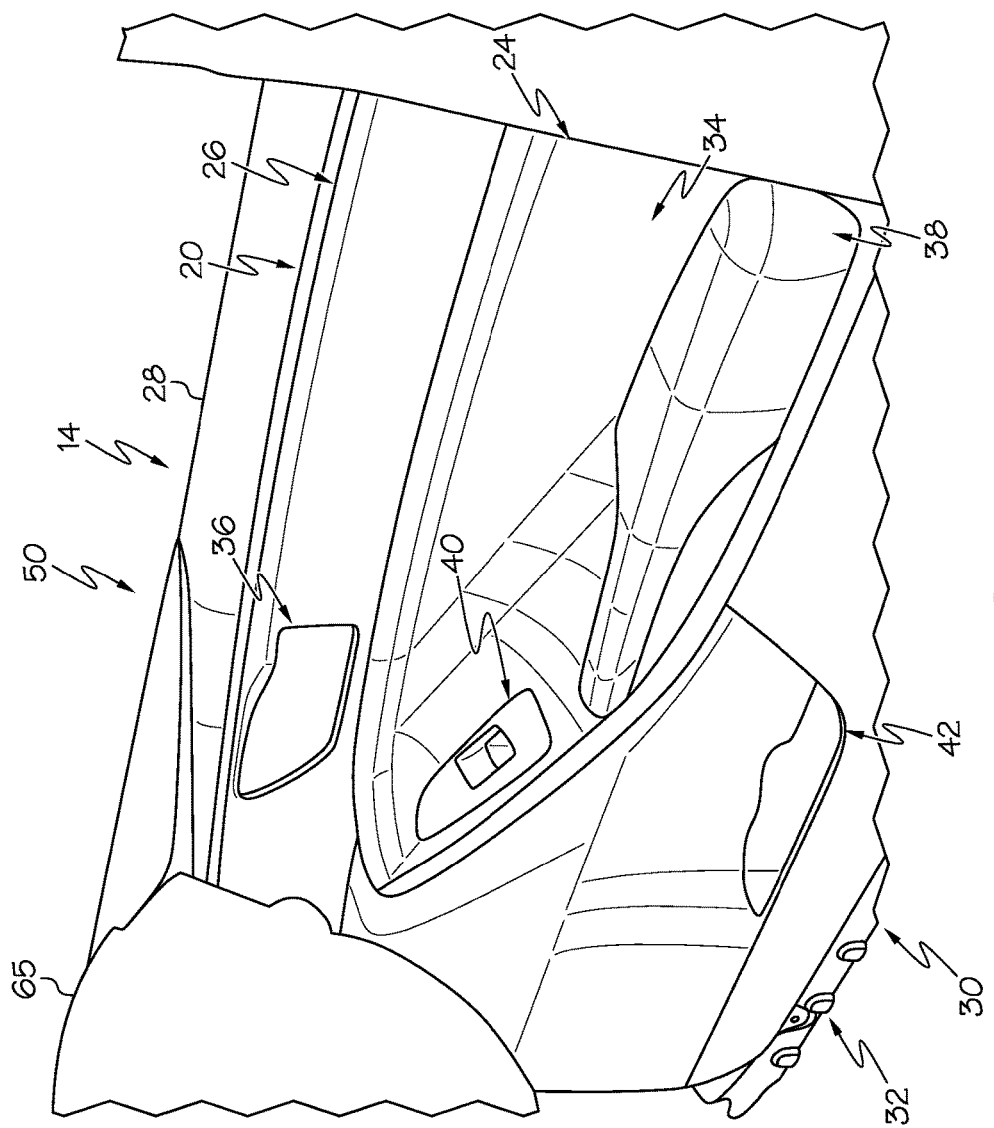
FIG. 2 is an interior view of the vehicle of FIG. 1 illustrating a door trim assembly, according to one or more embodiments shown and described herein.

Referring to FIG. 2, an exemplary interior view of the vehicle 10 is illustrated and includes the passenger side vehicle door 14 and interior door trim panel 20. The interior door trim panel 20 includes a door trim assembly 24 including an upper portion 26 nearest a window frame 28, a lower portion 30 nearest a rocker assembly 32 (FIG. 1) and an intermediate portion 34 located between the upper portion 26 and the lower portion 30. A door handle attachment location 36 may be provided by the upper portion 26. An armrest structure 38 may be provided by the intermediate portion 34, along with a control attachment location 40 for attachment of a user input for controlling operation of, for example, a window assembly and door lock mechanisms. Storage bins 42 may be provided by the lower portion 30.

The ornament member 50 extends generally from a dashboard 65 located at the front edge 52 rearward in the vehicle longitudinal direction over and, in some embodiments, beyond the door handle attachment location 36 to the rear edge 54. The door handle attachment location 36 is separated from the ornament member 50 and is located at a laterally facing surface of the upper board 62.

Figure 3:
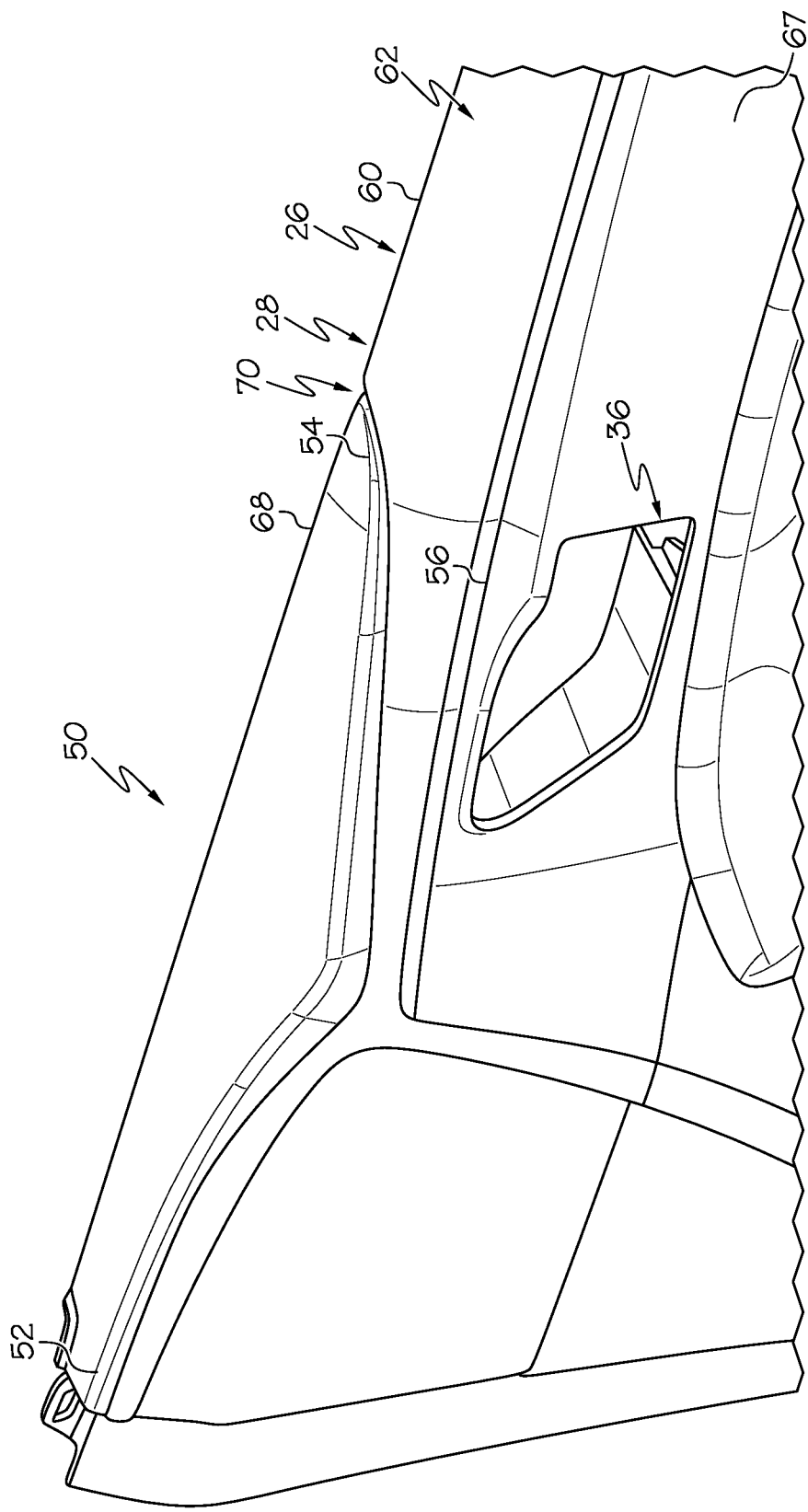
FIG. 3 is a detail view of the door trim assembly of FIG. 2 including an ornament member, according to one or more embodiments shown and described herein.

An ornament member 50 may be provided by the upper portion 26. FIG. 3 illustrates a more detailed view of the ornament member 50 and the upper portion 26. The ornament member 50 may be formed of a rigid plastic material and may include a decorative design, such as woodgrain to supplement an appearance of the door trim assembly 24. The ornament member 50 includes a front edge 52, a rear edge 54 and side edges 56 and 58 that extend between the front edge and the rear edge 54. As can be seen, the ornament member 50 is located at an interior, upper facing surface 60 of the upper portion 26, extending toward the window frame 28 in the vehicle lateral direction and above the door handle attachment location 36.

Figure 4:
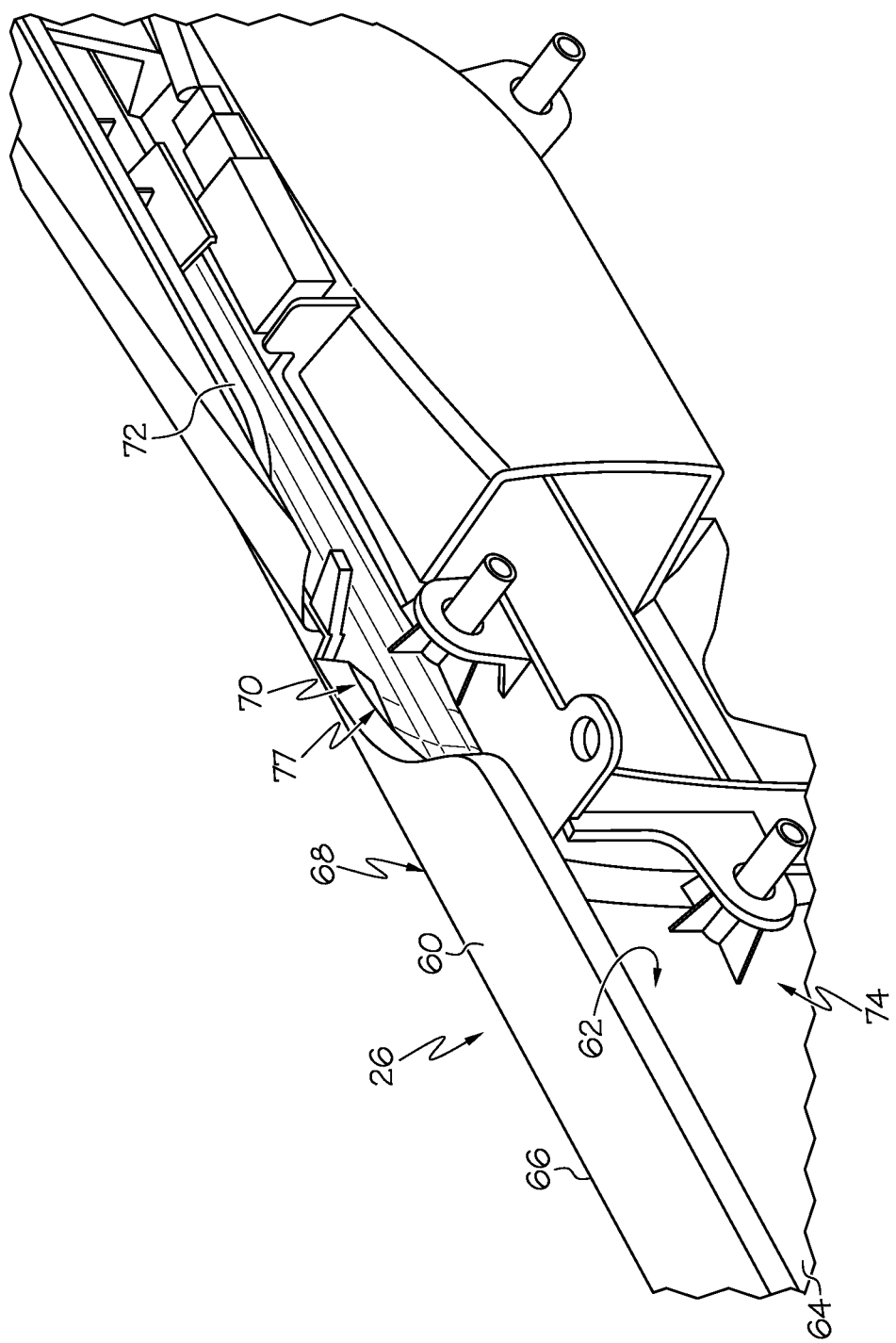
FIG. 4 is an outer view of the door trim assembly of FIG. 3 with the ornament member removed, according to one or more embodiments shown and described herein.

Referring to FIG. 4, the upper portion 26 includes an upper board 62 that includes a substrate body 64 and an outer covering 66 that covers an interior surface 68 of the substrate body 64. The outer covering 66 may be formed of a material that is more flexible (e.g., cloth, vinyl, leather, etc.) than material forming the substrate body 64 (e.g., polypropylene, acrylonitrile butadiene styrene, etc.). In some embodiments, the ornament member 50 may be formed of a material that is more rigid than material forming the substrate body 64. The upper board 62 has a cutout region 70 formed at an outboard edge 72 facing the window frame 28. The cutout region 70 is provided for connecting the ornament member 50 to the upper board 62 at the rear edge 54. As can be seen, the upper board 62 curves outboard in the vehicle lateral direction providing the interior, upper facing surface 60 such that the upper board 62 covers a portion of a space 74 between the interior door trim panel 20 and the outer panel 16 of the vehicle door 14 (FIG. 1). The cutout region 70 extends inwardly from the outboard edge 72 of the upper board 62 to provide a space 77 of increased area between the window frame 28 and the upper board 62.

Figure 5:
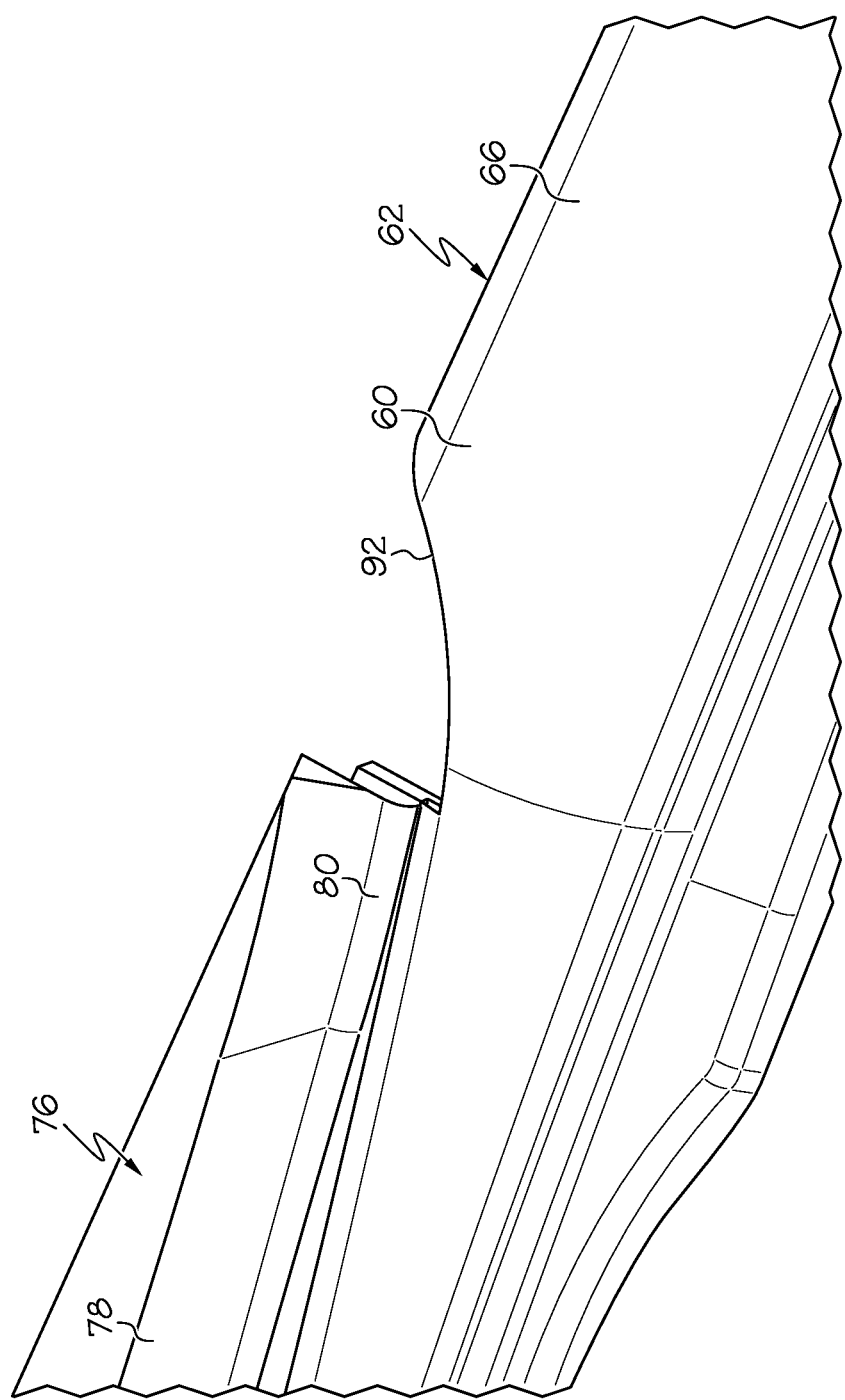
FIG. 5 is an interior view of the door trim assembly of FIG. 3 with the ornament member removed, according to one or more embodiments shown and described herein.

Referring briefly to FIG. 5, the upper board 62 further includes an ornament connection location 76 on the interior, upper facing surface 60 of the upper board 62. The ornament connection location 76 may include a raised surface region 78 providing a raised lip 80 that follows an interior peripheral contour of the ornament member 50. The raised lip 80 can be used in connecting the ornament member 50 to the upper board 62. In some embodiments, the outer covering 66 may be provided at the ornament connection location 76 such that the ornament member 50 covers the outer covering 66 when connected to the upper board 62. Any suitable connection may be used, such as using fasteners and/or adhesives.

Figure 6:
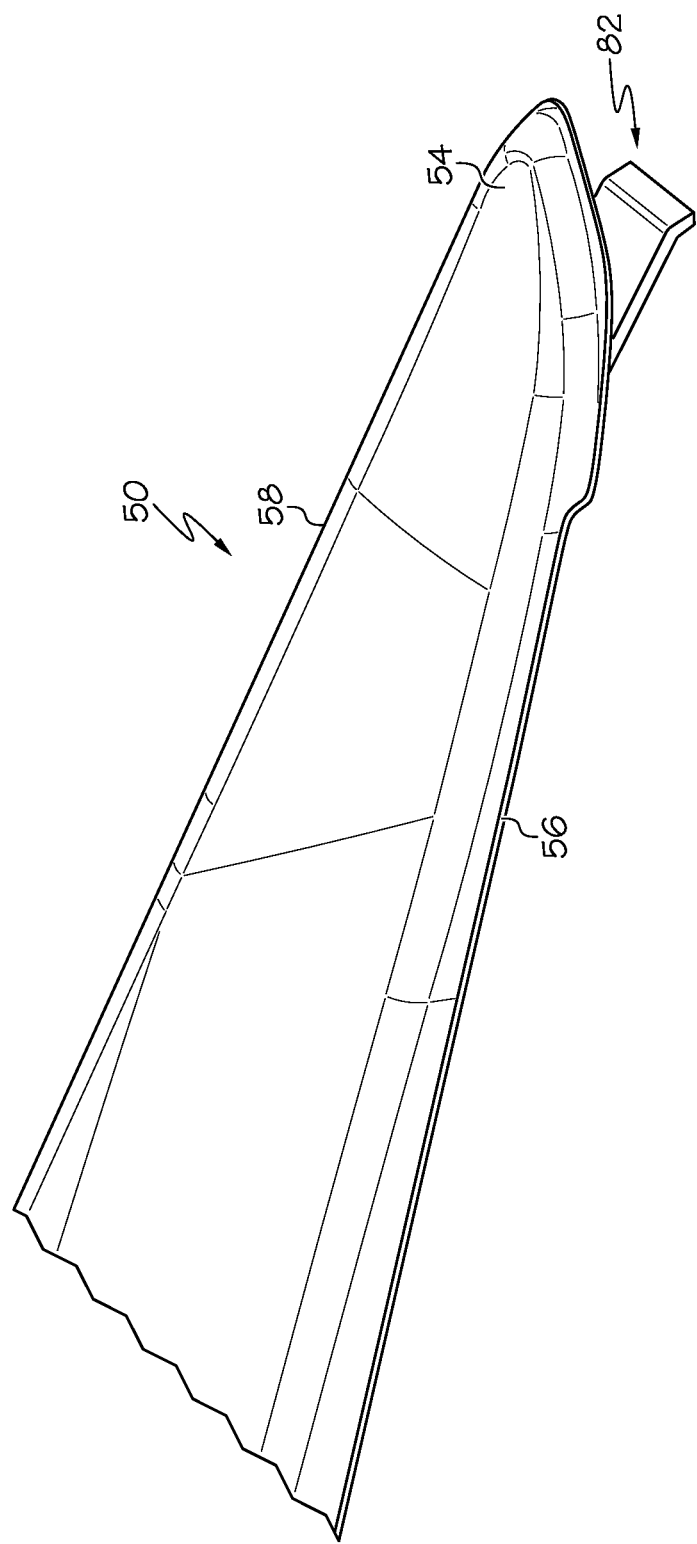
FIG. 6 is a detail top perspective view of the ornament member of FIG. 3 in isolation, according to one or more embodiment shown and described herein.
Figure 7:
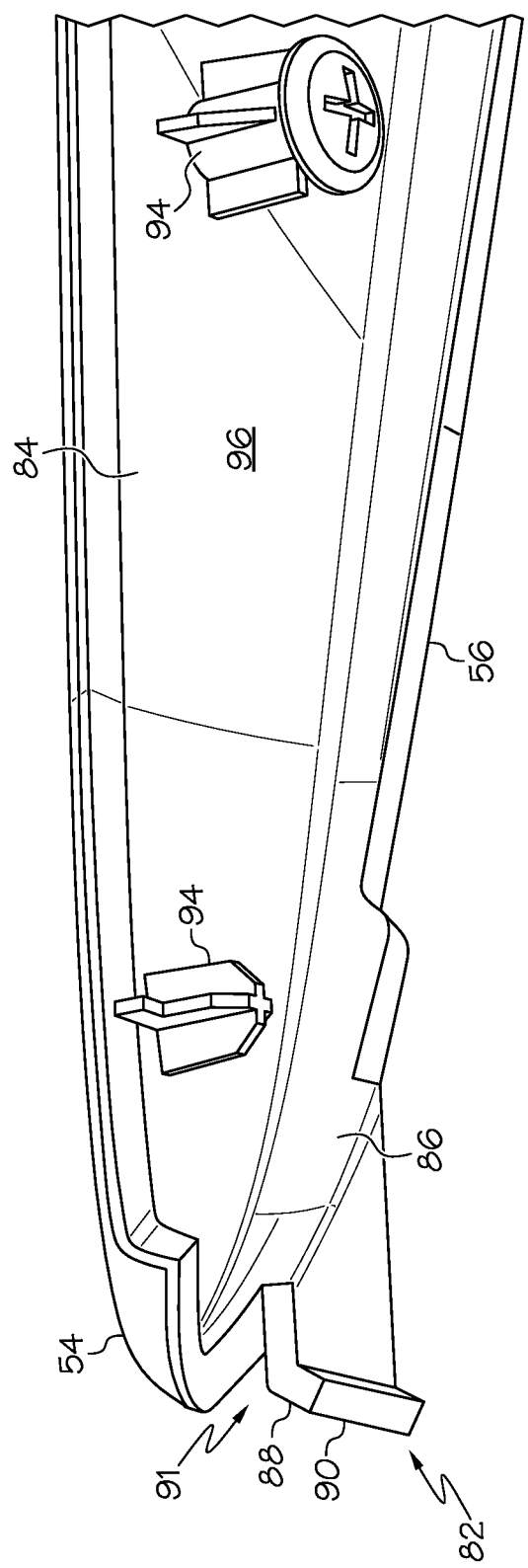
FIG. 7 is a detail bottom perspective view of the ornament member of FIG. 6, according to one or more embodiments shown and described herein.

Referring to FIG. 6, a partial view of the ornament member 50 illustrating the rear edge 54 is provided. As discussed above, the ornament member 50 includes the rear edge 54 and side edges 56 and 58 that extend between the rear edge 54 and the front edge 52 (FIG. 3). An interference member 82 extends rearward from the rear edge 54 in the vehicle longitudinal direction. As shown more clearly by FIG. 7, the interference member 82 may be integrally formed with an ornament body 84. The interference member 82 may be formed as part of the side edge 56 and/or rear edge 54, extending outwardly therefrom to underhang the rear edge 54.

In particular, the interference member 82 may include a base portion 86 that connects to the side edge 56 and a catch portion 88 that extends outwardly from the base portion 86 to a free end 90. In some embodiments, the free end 90 extends beyond the rear edge 54 of the ornament member 50. The catch portion 88 may have any suitable shape, which may depend, at least in part on the geometry of the upper board 62. The interference member 82 may extend outwardly from the side edge 56 and/or rear edge 54 beyond the rear edge 54 providing a gap 91 between the interference member 82 and the rear edge 54 above the catch portion 88. As will be described below, the gap 91 is provided to receive an edge 92 of the upper board 62 (FIG. 5) at the cutout region 70. Connecting features 94 (e.g., pegs) may be provided at a bottom surface 96 of the ornament body 84 to connect the ornament member 50 to the upper board 62 directly or indirectly.

Figure 8:
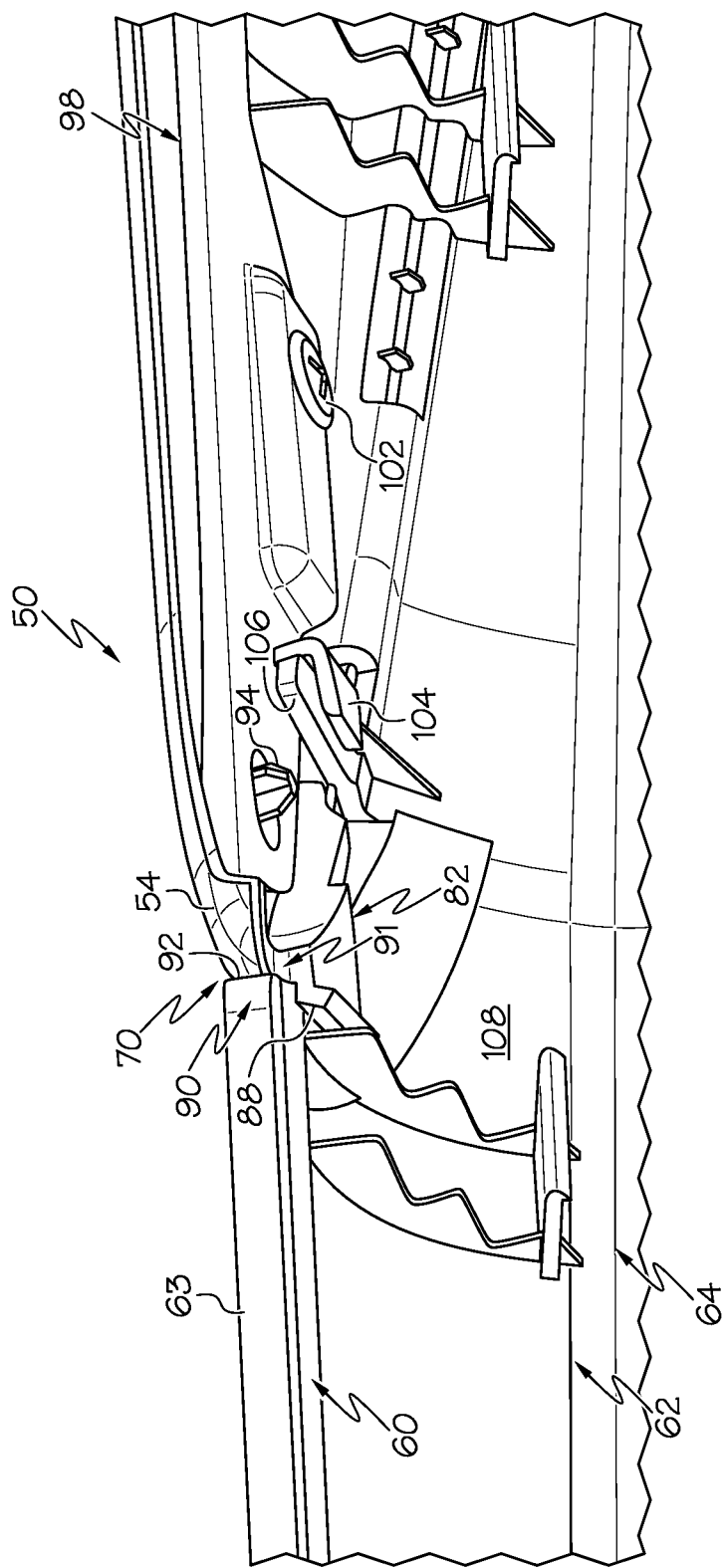
FIG. 8 is an outer view of the door trim assembly of FIG. 3 illustrating a connection between the ornament member and an upper board, according to one or more embodiments shown and described herein.

Referring to FIG. 8, the connection between the rear edge 54 of the ornament member 50 and the upper board 62 is illustrated. The ornament member 50 may be connected to the upper board 62 indirectly using an ornament connecting body 98. The ornament connecting body 98 may be connected to the ornament member 50 using the connecting features 94 and fastener 102. The ornament connecting body 98 may include a hook member 104 that engages a tab 106 that projects laterally outboard from an outboard surface 108 of the substrate body 64. The ornament connecting body 98 may include multiple hook members that engage multiple tabs 106 of the substrate body 64. The hook member 104 and the tab 106 can inhibit removal of the ornament member 50 from the upper board 62. In other embodiments, the ornament connecting body 98 may be an integral part of the substrate body 64.

The rear end 54 of the ornament member 50 is located at the cutout region 70 of the upper board 62. Providing the cutout region 70 allows the rear end 54 of the ornament member 50 to abut the edge 92 of the cutout region 70, which can provide a more seamless visual and tactile transition between the ornament member 50 and the upper board 62 at the rear end 54.

The interference member 82 extends beyond the rear edge 54 of the ornament member 50 and the edge 92 of the cutout region 70 to the catch portion 88. The catch portion 88 of the interference member 82 is located below top surface 63 of the upper board 62 and adjacent the outboard surface 108 of the substrate body 64. The edge 92 of the cutout region 70 may be located above the catch portion 88 at the gap 91 between the interference member 82 and the rear edge 54 of the ornament member 50.

Referring briefly again to FIG. 3, the cutout region 70 provided in the upper board 62, while facilitating attachment of the rear edge 54 of the ornament member 50, can also provide a hinge location about which the upper board 62 can bend during a side impact event. The bending at the upper board 62 about the cutout region 70 can cause inboard rotation of the rear edge 54 of the ornament member 50. The interference member 82 is provided to limit inboard rotation of the rear edge 54 of the ornament member 50 by engaging the outboard surface 108 of the substrate body 64.

Figure 9:
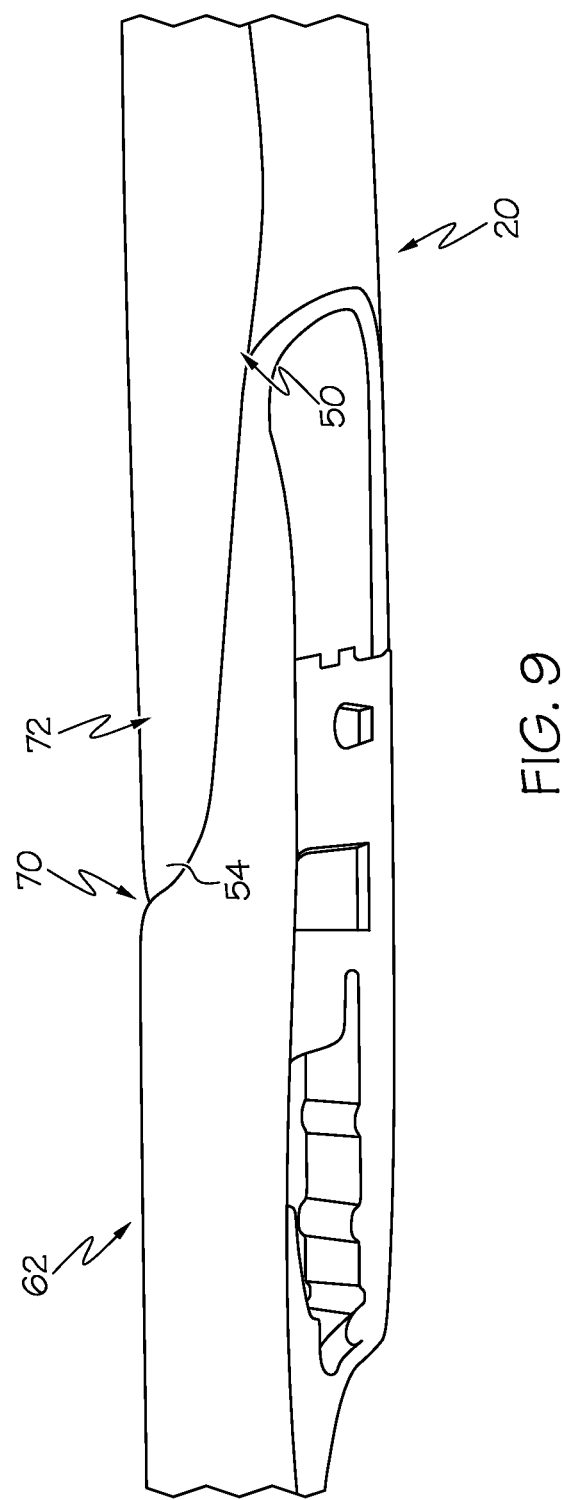
FIG. 9 illustrates the door trim assembly of FIG. 3 in operation, according to one or more embodiments shown and described herein.
Figure 10:
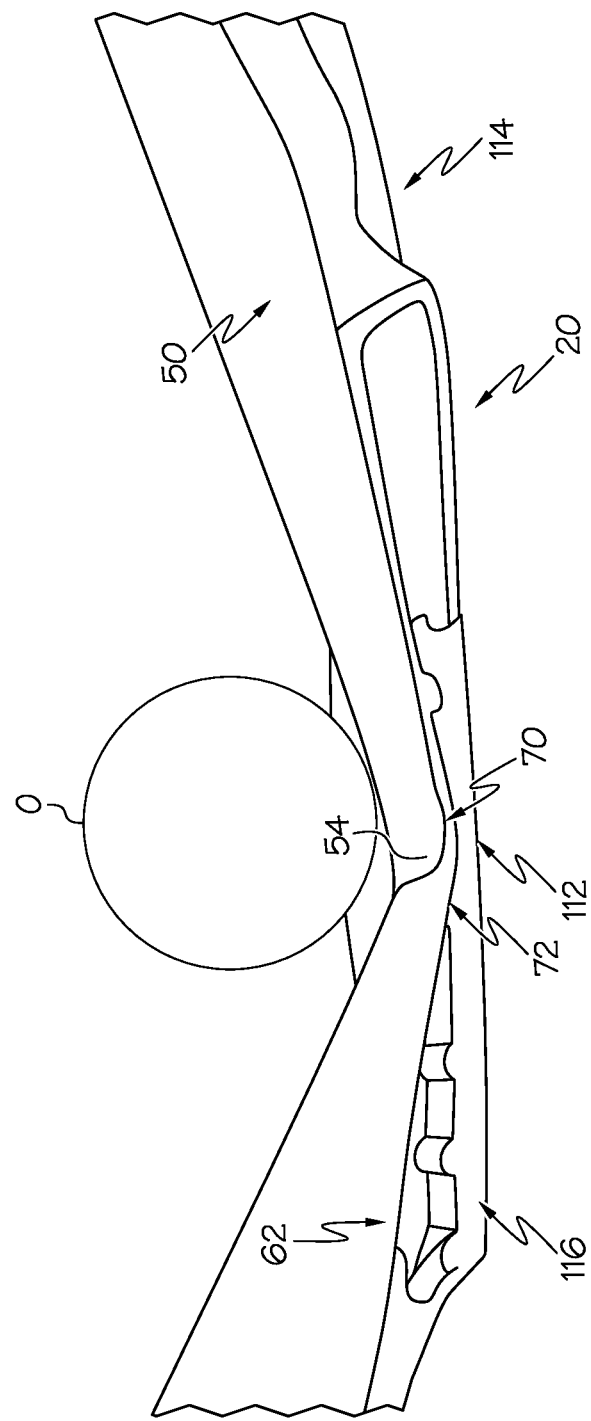
FIG. 10 illustrates the door trim assembly of FIG. 3 in operation, according to one or more embodiments shown and described herein.

FIGS. 9 and 10 illustrate operation of the ornament member 50 with the interference member 82. FIG. 9 shows the interior door trim panel 20 in isolation in an original, undeflected configuration. In the undeflected orientation, the upper board 62 extends in generally a line that extends in the vehicle longitudinal direction. The rear edge 54 of the ornament member 50 is connected to the upper board 62 at the cutout region 70. FIG. 10 shows the interior door trim panel 20 in a deflected state in response to a side impact from a side impactor O. As the side impactor O moves into the vehicle door, the upper board 62 may bend at the hinge location 112 provided by the cutout region 70 where material is removed from the upper board 62. As can be seen, the bend at the hinge location 112 generally divides the upper board 62 into a forward portion 114 and a rearward portion 116 with the rear edge 54 of the ornament member 50 located therebetween. In response to the side impactor O moving into the vehicle door, the forward portion 114 and the rearward portion 116 may rotate about the hinge location 112 provided by the cutout region 70. As can be seen by FIG. 10, the rear edge 54 of the ornament member 50 remains connected with the upper board 62 during this rotation.

Figure 11:
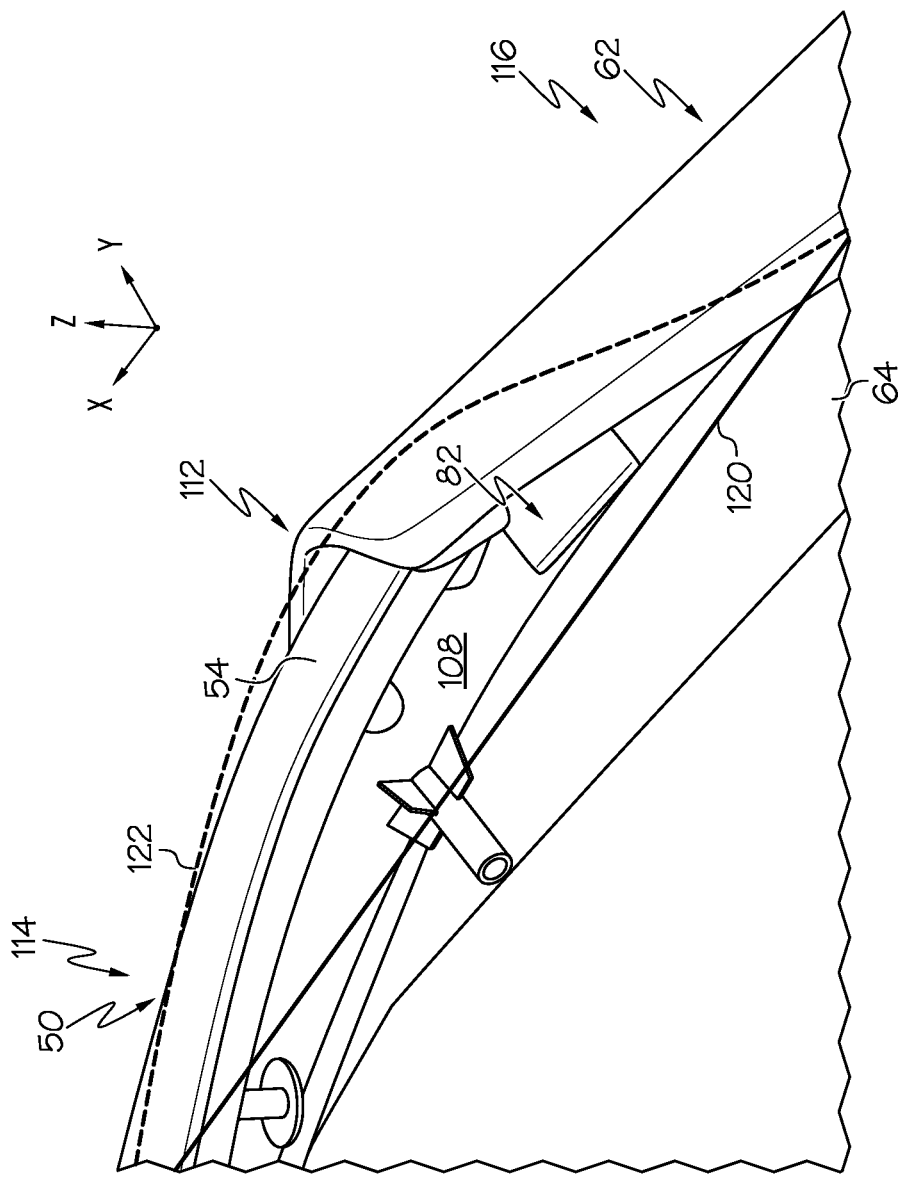
FIG. 11 illustrates the door trim assembly of FIG. 3 in operation, according to one or more embodiments shown and described herein.
Figure 12:
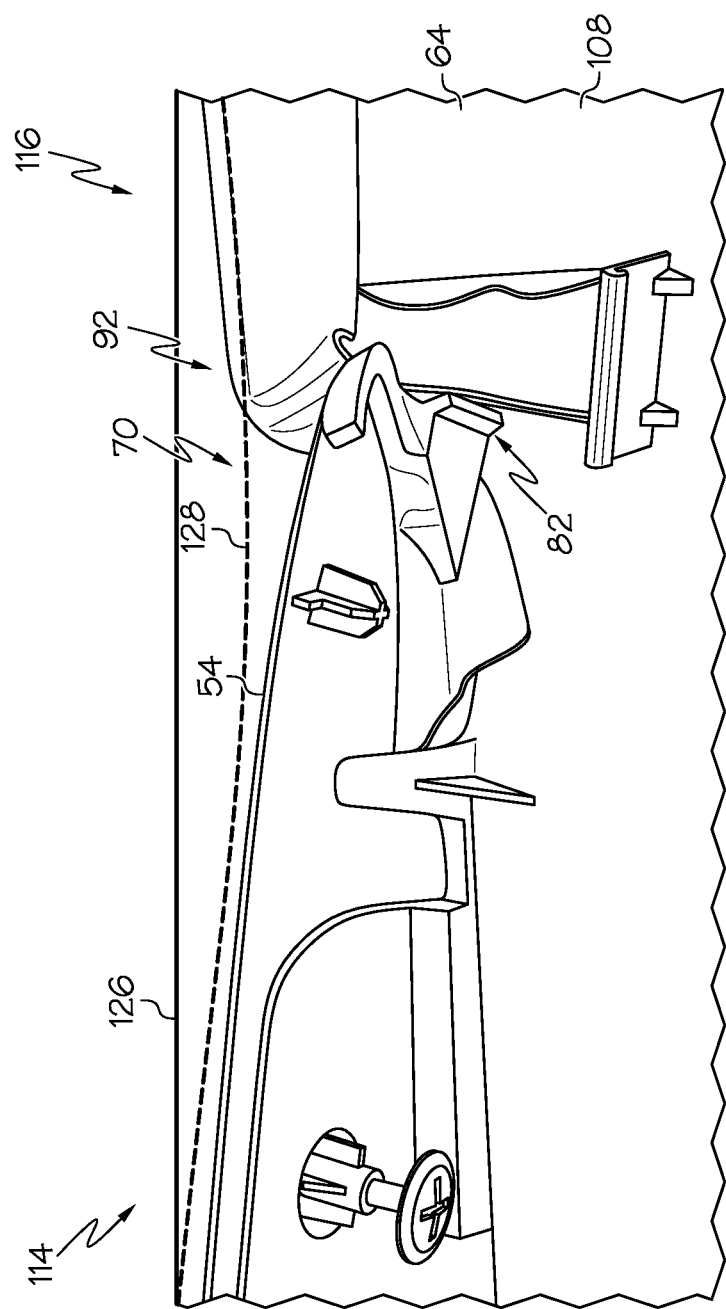
FIG. 12 illustrates the door trim assembly of FIG. 3 in operation, according to one or more embodiments shown and described herein.

FIGS. 11 and 12 illustrate operation of the interference member 82 during a side impact event. Referring first to FIG. 11, as the upper board 62 moves inboard due to the engagement with the side impactor O, the forward portion 114 and the rearward portion 116 of the upper board 62 rotate relative to each other about the hinge location 112 from the undeflected configuration as represented by line 120 to the deflected configuration as represented by dotted line 122. The line 122 also shows the increased rigidity of the ornament member 50 relative to the upper board 62 with less bending of the ornament member 50 compared to the upper board 62. The rear edge 54 of the ornament member 50 being located at the hinge location 112 also rotates inboard in the vehicle lateral direction as the forward portion 114 rotates. As the rear edge 54 of the ornament member 50 rotates, the interference member 82 engages the outboard surface 108 of the substrate body 64. The engagement between the interference member 82 and the substrate body 64 interlocks the ornament member 50 with the upper board 62 during the side impact event, which limits movement of the rear edge 54 of the ornament member 50 relative to the upper board 62.

Referring to FIG. 12, in some embodiments, the location of the interference member 82 below the edge 92 of the cutout region 70 causes the rear edge 54 of the ornament member 50 to move underneath the substrate body 64 as the forward portion 114 moves relative to the rearward portion 116. As the interference member 82 engages the outboard surface 108 of the substrate body 64 due to rotation of the forward portion relative to the rearward portion 116, the interference member 82 may slide down the outboard surface 108 in the vehicle vertical direction, which draws the rear edge 54 of the ornament member 50 from the undeflected configuration as represented by the line 126 below the edge 92 of the cutout region 70 as represented by the dotted line 128. The deflection of the rear edge 54 of the ornament member 50 below the edge 92 of the cutout region 70 can further serve to interlock the rear edge 54 of the ornament member 50 with the upper board 62 thereby limiting movement of the ornament member 50 relative to the upper board 62 due to movement of the side impactor O into the vehicle door.

Figure 13:
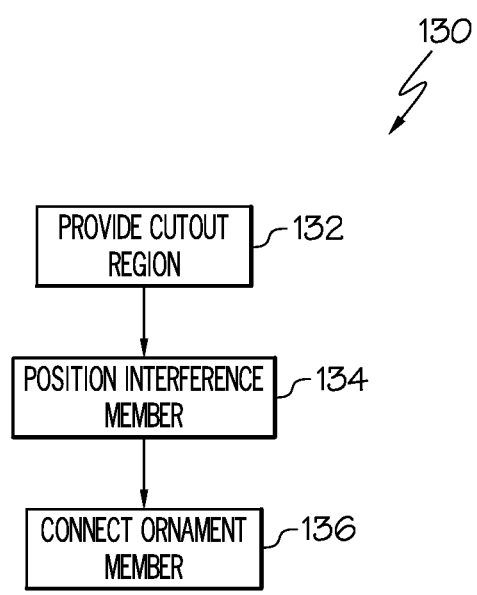
FIG. 13 illustrates a method of assembling an ornament member to an upper board of a vehicle door.

Referring now to FIG. 13, a method 130 of assembling an ornament member to an upper board of a vehicle door includes providing the upper board with a cutout region at a top surface of the upper board where the upper board extends outboard in the vehicle vertical direction toward a window frame of the vehicle door at step 132. At step 134, an interference member of the ornament member is positioned underneath an edge of the cutout region such that the interference member is positioned adjacent an outboard surface of the upper board. At step 136, the ornament member is connected to the upper board using fasteners, for example.

The above-described ornament members include an interference member that can interlock with an upper board during a side impact event. The interference member extends outwardly from a rear edge of the ornament member and is located to provide a gap between the interference member and the rear edge in order to receive an edge of a cutout region of the upper board. While the ornament members described above includes the interference member extending outwardly beyond the rear edge, the interference member may extend from any of the front edge, the rear edge and the side edges, depending on the geometry of the trim panel. Further, multiple interference members may be provided. The upper board is provided with the cutout region in order to connect the ornament member to the upper board. During a side impact event, such as using a side impactor during a side impact test, the cutout region provides the upper board with a hinge location where a forward portion of the upper board rotates relative to a rearward portion. As the forward portion rotates from an undeflected configuration toward a deflected configuration, the interference member engages the outboard surface of the upper board thereby interlocking the ornament member with the upper board. Further, the rear edge of the upper board may move below the edge of the cutout region further interlocking the rear edge with the upper board. The interlock between the rear edge and the interference member with the upper board can inhibit movement of the rear edge of the ornament member relative to the upper board.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a vehicle body, and
a vehicle door connected to the vehicle body, the vehicle door including an interior trim panel comprising an upper board and an ornament member that is connected to an interior surface of the upper board, the ornament member having a front edge, a rear edge and side edges that extend from the front edge to the rear edge, the ornament member including an interference member that extends outwardly of the rear edge and extends rearward in a vehicle longitudinal direction outward under the upper board to interface with the upper board during a side impact event.

2. The vehicle of claim 1, wherein the interference member extends outwardly beyond the rear edge and under the upper board at a space between the upper board and a window frame of the vehicle door.

3. The vehicle of claim 2, wherein the space is provided by a cutout region formed in the upper board.

4. The vehicle of claim 3, wherein the cutout region is located at an outboard edge of the upper board that faces the window frame.

5. The vehicle of claim 1, wherein the upper board includes an ornament connection location that is located at an interior upper facing surface portion of the upper board where the upper board extends outboard in a vehicle lateral direction toward a window frame.

6. The vehicle of claim 1, wherein the interior trim panel comprises a door handle attachment location, the ornament member separated from the door handle attachment location.

7. The vehicle of claim 1, wherein the upper board comprises a substrate body and an outer covering that covers the substrate body, the interference member located adjacent an outboard surface of the substrate body.

8. The vehicle of claim 7, wherein the ornament member comprises a material that is more rigid than a material forming the substrate body.

9. An interior trim panel for a vehicle door, the interior trim panel comprising:
an upper board; and
an ornament member connected to an interior surface of the upper board, the ornament member having a front edge, a rear edge and side edges that extend from the front edge to the rear edge, the ornament member including an interference member that extends outwardly of the rear edge and extends rearward in a vehicle longitudinal direction outward under the upper board to interface with the upper board during a side impact event.

10. The interior trim panel of claim 9, wherein the interference member extends outwardly beyond the rear edge and under the upper board at a space provided by a cutout region formed in the upper board.

11. The interior trim panel of claim 10, wherein the cutout region is located at an outboard edge of the upper board that faces a window frame of the vehicle door.

12. The interior trim panel of claim 9, wherein the upper board includes an ornament connection location that is located at an interior upper facing surface portion of the upper board where the upper board extends outboard in a vehicle lateral direction toward a window frame of the vehicle door.

13. The interior trim panel of claim 9 comprising a door handle attachment location, the ornament member separated from the door handle attachment location.

14. The interior trim panel of claim 9, wherein the upper board comprises a substrate body and an outer covering that covers the substrate body, the interference member located adjacent an outboard surface of the substrate body.

15. The interior trim panel of claim 14, wherein the ornament member comprises a material that is more rigid than a material forming the substrate body.

16. A method of assembling an ornament member to an interior trim panel of a vehicle door, the method comprising:
connecting the ornament member to an upper board of the interior trim panel at an ornament connection location located on an interior surface of the upper board; and
locating an interference member that extends outwardly of a rear edge of the ornament member and extends rearward in a vehicle longitudinal direction outward under the upper board to interface with the upper board during a side impact event.

17. The method of claim 16 further comprising providing the upper board with a cutout region, wherein the step of locating the interference member includes locating the interference member under an edge of the cutout region.

18. The method of claim 16, wherein the step of locating the interference member includes locating the interference member adjacent an outboard surface of the upper board.

19. The method of claim 16, wherein the ornament connection location is located at an interior upper facing surface of the upper board where the upper board extends outboard in a vehicle lateral direction toward a window frame of the vehicle door.

20. The method of claim 16, wherein the ornament connection location is separated from a door handle attachment location.

* * * * *